United States Patent Office 3,470,957
Patented Oct. 7, 1969

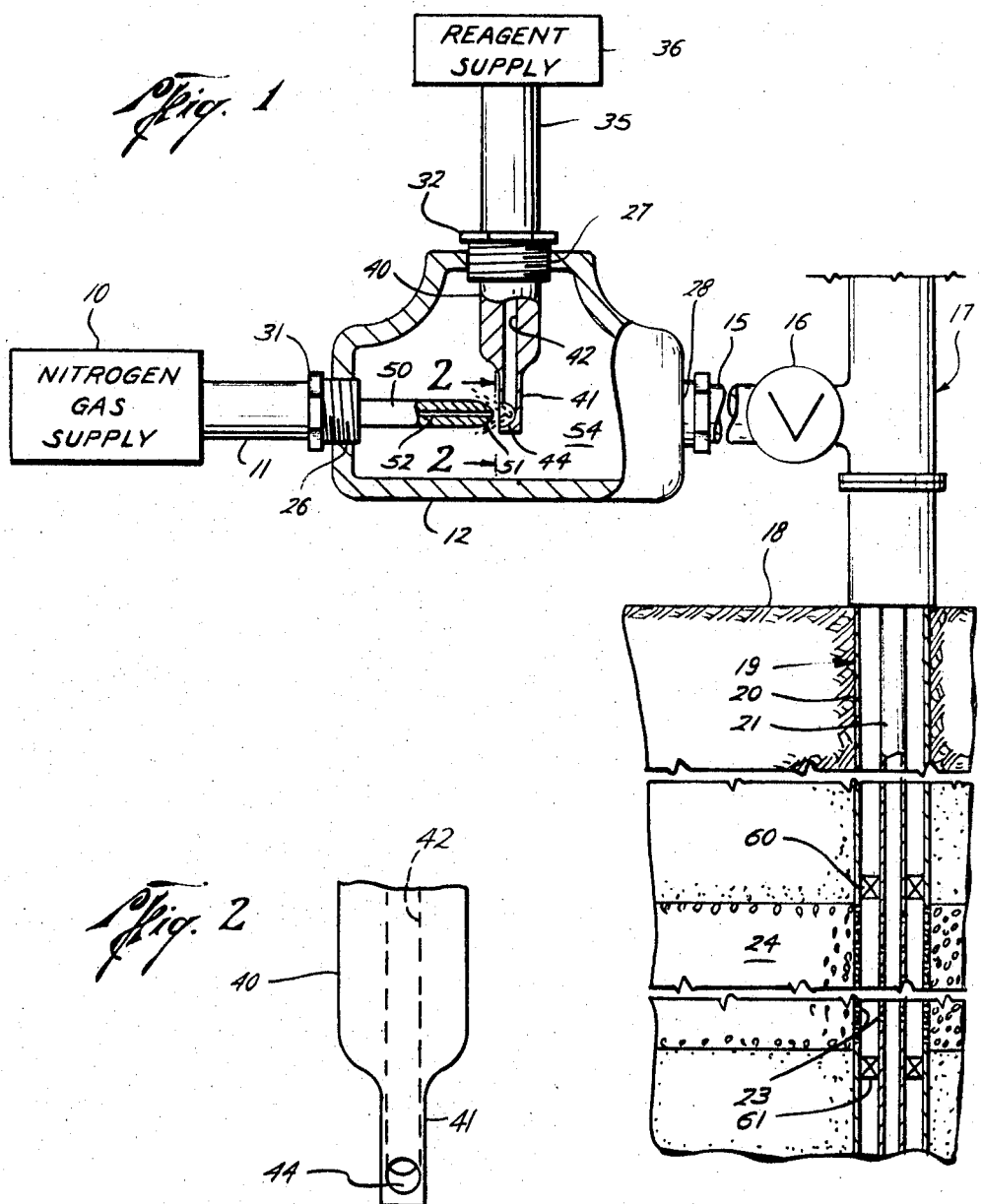

3,470,957
WELL SEALING WITH ATOMIZED RESIN
Billy E. Hamilton, Marrero, La., assignor to Big Three Industrial Gas & Equipment Co., Inc., Houston, Tex., a corporation of Texas
Filed Mar. 10, 1967, Ser. No. 622,177
Int. Cl. E21b 33/13
U.S. Cl. 166—295                              2 Claims

ABSTRACT OF THE DISCLOSURE

The disclosure is of novel methods and apparatus for the sealing, or consolidation of earth formations surrounding wells. Through use of the methods and apparatus presented, resin, or the like, is infiltrated into earth formations surrounding wells in highly atomized or gasified form, so that the formation surfaces are coated and are deeply penetrated so that superior consolidation of the earth formation results, at the same time preserving the natural porosity of the formation for production of petroleum products through the formation.

BACKGROUND OF THE INVENTION

Field of the invention

The invention relates to problems encountered when a well passes through relatively loose or unconsolidated earth formations. The loose materials tend to crumble and fall from the walls of the well, which is undesirable. The well itself may become plugged, or equipment in the well and at the surface may become plugged or inoperative. The unconsolidated earth materials are usually in the form of sand, or the like, which may become circulated throughout the well or be carried out of the well by gas or liquid streams. Materials other than sand may tend to cave from the walls of the well to cause difficulties. It is desirable that the walls of the well be stable so that these difficulties will not be encountered.

DESCRIPTION OF THE PRIOR ART

The prior art methods for the consolidation of loose materials surrounding wells include the use of cement, plastics and resins in liquid form which are introduced to fill spaces within the well to accomplish consolidation, or to line the walls of the well to accomplish consolidation. These materials have been forced in liquid form under pressure into formations surrounding wells to achieve consolidation. But when these materials are employed in liquid form, the usages of the materials is extravagant, and the consolidation is frequently deficient because the materials cannot be sufficiently penetrated into the formations from the well bore. The viscosities and permeation characteristics of liquids are deficient as compared with gases.

SUMMARY

According to the invention, one or more resin materials are atomized in a gas stream and pressured into the formations surrounding a well, and then allowed to set to cause thorough and effective consolidation. Because the resin is highly dispersed, a relatively small amount is effective to penetrate and coat a large volume of unconsolidated earth material. The degree of penetration from the well bore is very high, so that consolidation is effected to considerable distances from the well bore. At the same time, since the interstices of the unconsolidated earth materials are not filled with the resin, porosity of the formation may be preserved.

The resin material may be atomized by use of a special atomizing apparatus provided by the invention wherein a high velocity gas stream impinges on the resin in a shaped chamber, and from which a very high degree of atomization or dispersion of the resin in the gas results. The atomizer apparatus is especially well adapted to causing atomization of resin according to this invention, but this is not to say that the atomization of the resin may not be accomplished using another apparatus.

The invention solves problems not heretofore solved in the art. Lesser quantities of resin will consolidate larger volumes of unconsolidated material than when resins in liquid form are employed. Deeper penetration into the formation results because of the high degree of dispersion of resin in the gas stream which is of low-viscosity and can be driven into the formation to greater distances and at lower pressures than has been the case when liquid materials have been forced into formations by use of pressure. The carrier gas flows more readily through the interstices of formations than do liquids, and the atomized resin carried by the gas is coated uniformly over the internal surfaces of the formation so that all of the particles making up the formation are cemented together by the resin.

BRIEF DESCRIPTION OF THE DRAWINGS

FIG. 1 is an elevational view of a preferred form of apparatus according to the invention, also illustrating a preferred form of the methods according to the invention, the view being partially in vertical cross section and partially schematic.

FIG. 2 is an enlarged partial view taken at line 2—2 of FIG. 1.

DESCRIPTION OF PREFERRED EMBODIMENT

Referring now to the drawings in detail, a supply 10 of nitrogen or other preferably inert gas under pressure is connected through conduit or pipe 11 with body 12 which is usually in the form of a pipe T. At the other side of body 12 from pipe 11, a conduit or pipe 15 connected to body 12 leads to a valve 16 forming an inlet to well head apparatus 17. Apparatus 17 is supported above the earth's surface 18 at a well 19 lined by casing 20 having inner concentric pipe or tubing 21 therein.

The expression, "inert gas," as herein used, means gases which are inert under the conditions found in wells, i.e., non-combustible, non-explosive, and including particularly nitrogen and carbon dioxide. Any other gases, inert or not, or mixtures of gases, may be used in the process, i.e., natural gas, air, etc., but when these gases are used the safety of the process may be impaired.

The form of well completion apparatus and well as described and shown are exemplary, and any form of well using any form of suitable equipment may be substituted. In other words, well head apparatus 17 may take any form known in the art, and the well 19 may include any combination of casings and tubings as are commonly used in the art. For purposes of the invention, it is necessary that the outflow from within body 12 through conduit 15 be connected for fluid flow down through a pipe into a well to the location of an unconsolidated formation which is to be treated according to the invention. The pipe or tubing may have perforations 23 at or adjacent to an unconsolidated earth formation 24, or, the pipe 21 may terminate at or near the formation with outflow from the open lower end of the pipe. The essential thing according to the invention is that conduit means be provided from surface to the unconsolidated formation or near enough thereto so that the materials to be described may be delivered to the unconsolidated formation.

Referring now to FIGS. 1 and 2 of the drawings, body 12 is a hollow pressure vessel and has three ports 26, 27, 28 to its interior. Port 26 is threaded and a threaded bushing 31 threadingly connected to an end of pipe 11 is screwed thereinto. Pipe 15 is similarly connected to body 12 at port 28 by a threaded bushing 32. A third threaded bushing 33 is screwed into threaded port 27 to connect thereto a conduit or pipe 35 leading from a reagent supply or source 36.

A body 40 has a thread formation around its upper end which is screwed into the lower internal threads of bushing 32. Body 40 is concentrically reduced at its lower end as shown at 41, and has a concentric vertical passage 42 therethrough which terminates downwardly at an enlarged cup-like, or dished formation 44. The curved surface at the bottom of formation 44 is shown to be tangential with a side of passage 42, but this is not necessarily the case and formation 44 may if desired terminate at a different location with respect to passage 42.

A tubular body 50 is screwed (not shown) at one end into the internal threads of bushing 31 to be supported thereby. The opposite or inner end of body 50 is curvingly reduced at 51 to form a tip. The passage 52 longitudinally and concentrically through body 50 is open at the tip and is disposed in concentric but spaced relation to the circular opening of formation 44. The tip 51 of body 50 may be variably spaced with respect to formation 44, but generally speaking it is more desirable that the tip be closely spaced to the opening of formation 44 rather than being at a greater distance therefrom. The spacing is preferably about 1/4 inch.

The formation 44 and tip 51 of body 50 are disposed at a central portion of the interior chamber 54 of body 12.

Nitrogen or other gas from supply 10 is delivered pipe 11 and through the longitudinal passage 52 of body 50 to be emitted as a high velocity jet stream into the center of cup-like formation 44. From reagent supply 36, a liquid resin is delivered through pipe 35 and passage 42 into formation 44.

The term "resin" as herein used means any resin or plastic material which can be rendered in liquid form for dispersion in atomized form in a gas stream for delivery to an earth formation, and which when in place at the formation will set to cause consolidation of the formation by cement, gluing, or otherwise causing adherence between the particles or granules making up the formation. The resin may be caused to set by passage of time, by evaporation of a component, by chemical interaction or reaction, or other known suitable manner of setting of the resins herein referred to.

The high velocity jet stream of gas strikes the liquid in formation 44 and atomizes the liquid to a highly dispersed condition in the gas. The high velocity of the gas breaks up the liquid droplets to very minute form so that exceedingly small droplets of resin are suspended in the gas. The cup shape of formation 44 causes a cone-like flow of gas and resin from formation 44, from the center bottom of the formation up around the sides and out of the formation so that wall friction assists in breaking up the resin and dispersing the liquid to form a suspension of liquid in the gas. The atomized liquid-gas mixture flows from the left hand side of body 40 as shown in the drawings toward the outlet provided by pipe 15 and through valve 16 (which is open) and into pipe 21 extending downwardly into the well. The gasified resin flows outwardly through perforations 23 (or from the open lower end of a well pipe) to the formation 24 which is required to be consolidated by the resin. The pressured gas carries the atomized resin into the formation, coating the sand or other particles of the formation, and after the resin has set, the formation becomes of consolidated structure so that it does not tend to crumble or cave into the well bore.

In FIG. 1, the showing of the individual sand or other unconsolidated particles of formation 24 is, of course, greatly enlarged. The grains or particles may be very small. Since the resin is in a highly dispersed and atomized state in the gas stream, all particle surfaces of the unconsolidated formation are coated with resin and thereby adequately cemented together upon setting of the resin.

There may be, and usually are, means in the well bore for sealing off or isolating portions of the annular spaces so that the flow of atomized resin is restricted to certain areas of the annular spaces. The packers 60, 61 above and below formation 24 are examples of such apparatuses, and the pack-off provisions will vary from well to well.

The formation 24 may be either a producing formation or a nonproducing formation. It may be that it is desired to seal off the formation just for the purposes of simplifying the continued drilling of the well. Or, if the formation 24 is a producing formation, consolidation may be required to maintain the well in a flowing condition so that sluffing off and caving of the well bore will not plug the equipment in the well.

The body 12 may take any shape, so long as an internal pressure chamber is provided within which pressured gas may be admixed with resin in a manner which results in the resin becoming atomized in the gas stream for delivery into the well.

Body 50 may be a choke bean apparatus, or any other form of jet-forming apparatus which will produce the desired result as herein described. As has been heretofore stated, body 50 may terminate and preferably does terminate close to formation 44 so that spreading of the emitted gas stream will not occur before the gas has impinged upon the liquid resin. However, apparatuses may be made wherein a substantially greater spacing is provided between the end of body 50 and the formation 44 with satisfactory results. The passage 52 normally provides a restriction in the gas flow. The bore is usually of relatively small size. The gas pressure difference between the opposite ends of passage 52, that is the gas pressure difference between the gas in pipe 11 and in chamber 54, is preferably at least about 300 to 500 p.s.i. and may be 1,500 p.s.i., or higher. Pressure differences of about 500 p.s.i. are entirely satisfactory, and result in economies of operation since the power required for pumping or delivering the gas is less than when the pressures are higher. If the pressure difference is too small then inadequate atomization of the liquid resin may result. The passage 52 diameter may, for example, be from about 5/64 inch to about 14/64 inch, although smaller or somewhat larger sizes may be used. The volume of pressured gas delivered may range from below 100 cubic feet per minute to over 1,500 cubic feet per minute. The amount of liquid resin or plastic delivered through passage 42 to formation 44 may be from less than one gallon per minute to over 300 gallons per minute.

The preferred resin materials are the epoxy resins which are sold and supplied under the trade names "Eposand," Sanfix," and others. Any plastic or resin material which can be delivered to the formation and once delivered will set may be used. Accelerators may be added to hasten the setting. Any epoxy or other resin material adapted to set after being conveyed to the unconsolidated area by the gas stream may be used. The time required for the setting of the epoxy resins is from about 4 hours up to about 24 hours. Usually about one barrel of epoxy resin per linear foot of unconsolidated formation at the well bore is employed. Greater or lesser amounts may be employed depending upon the desired results. The methods may be utilized either before or after completion of the well, the treatment usually being done immediately after completion where the formation is a producing formation, and the methods may be employed at later times, often years later, when the well is being recompleted or worked over.

Other materials than the resin materials may be delivered into the well according to the methods. For example corrosion inhibitors, solvents, detergents (surfactants), acids, emulsion breakers, alcohol solvents, diesel oil to clean the formation, and substantially liquid material may be delivered according to the methods herein described. Any of the materials mentioned in United States Patent No. 3,100,528 may be delivered in the manner herein described. The employment of the methods according to this invention enhance the effectiveness of the procedures set forth in Patent No. 3,100,528. Regardless of which of the materials is to be introduced into the well, and regardless of the purpose for so introducing the material, the procedure is substantially the same.

As an example of a procedure carried out according to the invention, six gallons per minute of the epoxy resin "Eposand" was fed through passage 42 from supply 36 into formation 44. Nitrogen gas at a differential pressure of 600 p.s.i. (differential pressure between pipe 11 and chamber 54) was jetted into formation 44 to atomize the resin. The nitrogen formed a continuous gas phase in which the resin, forming the dispersed phase, was carried in atomized form through a pipe running into a well. The well pipe was perforated over a vertical length of 10 feet at an unconsolidated formation of the same depth or thickness. The introduction of atomized resin was continued until 10 barrels of resin were in place at and within the unconsolidated formation. The introduction of resin and gas were then discontinued. The resin was permitted to set for a period of 10 hours, and then the well was brought into production. No caving or disruption of the formation has since occurred, and the formation is in a very adequately consolidated condition and is open enough for continued adequate petroleum production from the well.

Because of the favorable flow characteristics of the resin and gas carrying the resin in atomized form, the consolidation extended to a considerable distance from the well bore. This effect may be determined by calculation after examination of a sample of the material of the formation. It may be estimated that in the example given above the penetration of resin was at least over five feet from the well bore. There was observed no pressure build-up in pipe 21 because of any plugging caused by the resin at the formation.

While preferred embodiments of the methods and apparatus have been described, many modifications thereof may be made by a person skilled in the art without departing from the spirit of the invention, and it is intended to protect by Letters Patent all forms of the invention falling within the scope of the following claims.

I claim:

1. Method for consolidating unconsolidated well formations with resin which is liquid at the time that it is delivered to the formation and subsequently sets in contact with the formation to consolidate the formation comprising atomizing liquid resin in a stream of pressured nitrogen gas such that nitrogen gas is the continuous phase and liquid resin is the dispersed phase thereof, said atomization being performed at the surface above the well, flowing the stream of pressured nitrogen gas containing atomized liquid resin down the well to the formation to be consolidated so that said stream penetrates the formation while said liquid resin remains atomized therein, said liquid resin upon contact therewith thinly and uniformly coating all exposed surfaces of said formation to which said stream has penetrated without blocking the interstices of the formation through which said stream has penetrated, and allowing said resin coating said formation surfaces to set to consolidate the formation, there being no substantial increase of pressure differential across said formation coated and consolidated by said resin whereby petroleum flow therethrough is not retarded.

2. The method according to claim 1, said resin coating the formation surfaces to a distance of at least five feet from the well bore.

References Cited

UNITED STATES PATENTS

| | | | |
|---|---|---|---|
| 2,265,923 | 12/1941 | Normand. | |
| 3,087,544 | 4/1963 | Forsman | 166—3 |
| 3,096,819 | 7/1963 | White et al. | 166— |
| 3,364,994 | 1/1968 | Sterrett | 166—4 |
| 3,367,417 | 2/1968 | McCabe | 166— |
| 3,373,812 | 3/1968 | Smith | 166—33 |
| 3,373,813 | 3/1968 | Jennings et al. | 166—33 |
| 2,808,886 | 10/1957 | Bail et al. | 166—2 |
| 2,815,815 | 12/1957 | Hower et al. | 166—3 |
| 3,100,528 | 8/1963 | Plummer et al. | 166—4 |
| 3,141,503 | 7/1964 | Stein | 166—2 |
| 3,299,953 | 1/1967 | Bernard | 166—21 XR |
| 3,330,350 | 7/1967 | Maly | 166—33 XR |

OTHER REFERENCES

Rhorback, "New Additive Promises Revised Steam Stimulation Economics," the Oil and Gas Journal Oct. 10, 1966 (pp. 207–209 relied on).

STEPHEN J. NOVOSAD, Primary Examiner